(12) United States Patent
Zheng et al.

(10) Patent No.: US 11,062,107 B2
(45) Date of Patent: *Jul. 13, 2021

(54) MANAGING SERVICES ASSOCIATED WITH URL-BASED TWO-DIMENSIONAL CODES

(71) Applicant: Advanced New Technologies Co., Ltd., George Town (KY)

(72) Inventors: Ji Zheng, Hangzhou (CN); Tianshun Lu, Hangzhou (CN); Xi Sun, Hangzhou (CN); Yong Pan, Hangzhou (CN); Qiaojian Zheng, Hangzhou (CN); Jiaqi Feng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/799,421

(22) Filed: Feb. 24, 2020

(65) Prior Publication Data

US 2020/0193110 A1 Jun. 18, 2020

Related U.S. Application Data

(63) Continuation of application No. 16/293,302, filed on Mar. 5, 2019, which is a continuation of application No. PCT/CN2018/093696, filed on Jun. 29, 2018.

(51) Int. Cl.
*G06K 7/14* (2006.01)
*H04M 1/72445* (2021.01)

(52) U.S. Cl.
CPC ...... *G06K 7/1417* (2013.01); *H04M 1/72445* (2021.01)

(58) Field of Classification Search
CPC ... G06K 7/1417; G06K 7/10; H04M 1/72564; G06Q 20/3276; G06Q 20/027;

(Continued)

(56) References Cited

U.S. PATENT DOCUMENTS

| 6,036,087 A | 3/2000 | Hong et al. |
| 7,698,442 B1 | 4/2010 | Krishnamurthy et al. |

(Continued)

FOREIGN PATENT DOCUMENTS

| CN | 104036355 | 9/2014 |
| CN | 105354747 | 2/2016 |

(Continued)

OTHER PUBLICATIONS

J. Gao, V. Kulkarni, H. Ranavat, L. Chang and H. Mei, "A 2D Barcode-Based Mobile Payment System," 2009 Third International Conference on Multimedia and Ubiquitous Engineering, Qingdao, China, 2009, pp. 320-329, doi: 10.1109/MUE.2009.62. (Year: 2009).*

(Continued)

*Primary Examiner* — Matthew Mikels
(74) *Attorney, Agent, or Firm* — Fish & Richardson P.C.

(57) ABSTRACT

Implementations of the present disclosure provide a service processing method, device, and system associated with unified resource locator (URL)-based two-dimensional (code). In an implementation, a URL is received from a first service institution. The URL is obtained by a mobile device from scanning a 2D code provided by a service provider and sent to the first service institution. The URL is then parsed to identify one or more data elements including a service network identifier, a service institution identifier, and a payload including a service object identifier. The one or more data elements is sent to the second service institution based on the service institution identifier. Service information associated with the service object is received from the second service institution based on the service object identifier, and the service information is sent to the first service institution for presenting on the mobile device.

18 Claims, 5 Drawing Sheets

(58) Field of Classification Search
CPC .... G06Q 20/12; G06Q 20/20; G06Q 30/0215; G06Q 20/102
USPC .................. 235/435, 439, 454, 462
See application file for complete search history.

(56) References Cited

U.S. PATENT DOCUMENTS

| | | |
|---|---|---|
| 2007/0136279 A1 | 6/2007 | Zhou et al. |
| 2012/0203664 A1 | 8/2012 | Torossian et al. |
| 2012/0233004 A1 | 9/2012 | Bercaw |
| 2013/0018726 A1 | 1/2013 | Ionescu et al. |
| 2015/0262241 A1 | 9/2015 | Shuster |
| 2015/0269599 A1* | 9/2015 | Lee .................. G06Q 30/0212 705/14.14 |
| 2015/0296599 A1 | 10/2015 | Recker et al. |
| 2015/0317060 A1 | 11/2015 | Debets et al. |
| 2016/0125088 A1* | 5/2016 | Sheedy ............ G06K 19/06037 235/380 |
| 2017/0046671 A1* | 2/2017 | Shauh ................ G06Q 30/0601 |
| 2017/0185693 A1 | 6/2017 | Lee et al. |
| 2020/0005008 A1* | 1/2020 | Zheng ............... G06Q 20/027 |

FOREIGN PATENT DOCUMENTS

| | | |
|---|---|---|
| CN | 105468350 | 4/2016 |
| CN | 105812472 | 7/2016 |
| CN | 107038205 | 8/2017 |
| JP | 2004287592 | 10/2004 |
| JP | 2008257540 | 10/2008 |
| JP | 2011145727 | 7/2011 |
| JP | 2015122009 | 7/2015 |
| KR | 101194531 | 12/2012 |
| KR | 20130000072 | 1/2013 |
| KR | 101450013 | 10/2014 |
| RU | 2335015 | 9/2008 |
| WO | WO 2018064294 | 4/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.

International Search Report and Written Opinion in International Application No. PCT/CN2018/093696, dated Mar. 27, 2019, 6 pages.

Nakamoto, "Bitcoin: A Peer-to-Peer Electronic Cash System," www.bitcoin.org, 2005, 9 pages.

Supplementary International Search Report in International Application No. PCT/CN2018/093696, dated Jan. 1, 2020, 8 pages.

European Extended Search Report in European Patent Application No. 18845459.9, dated May 8, 2020, 8 pages.

* cited by examiner

MANAGING SERVICES ASSOCIATED WITH URL-BASED TWO-DIMENSIONAL CODES

CROSS-REFERENCE TO RELATED APPLICATIONS

This application is a continuation of U.S. application Ser. No. 16/293,302, filed on Mar. 5, 2019, which is a continuation of PCT Application No. PCT/CN2018/093696, filed on Jun. 29, 2018, and each application is hereby incorporated by reference in its entirety.

TECHNICAL FIELD

The present application relates to the field of mobile transaction processing.

BACKGROUND

Machine-readable codes (hereinafter "codes") are used to encode information in a particular visual format that may be read by an electronic device to extract the encoded information. Such codes may be physically printed on a surface (such as product packaging) or displayed on a screen of an electronic device (such as a mobile phone). Example codes include barcodes and Quick Response (QR) codes.

Early codes were one-dimensional (1D) in that information was encoded in only one spatial dimension. For example, a standard barcode is a 1D code because the encoding symbols (the bars) modulate only on the horizontal axis of the code. The code is meant to be read on this horizontal axis to retrieve the encoded information, and no information is encoded by modulating the symbols on the vertical axis.

Two-dimensional (2D) codes, in which symbols are modulated on both the vertical and horizontal axes, were first used in the fields of manufacturing and transportation. QR codes are an example of a 2D code.

SUMMARY

The present disclosure describes methods and systems, including computer-implemented methods, computer program products, and computer systems for managing services associated with uniform resource locator (URL)-based 2D codes.

In an implementation, a URL is received from a first service institution, wherein the URL is sent by a mobile device and obtained by the mobile device from scanning a two-dimensional (2D) code provided by a service provider. The URL is parsed to identify one or more data elements including a service network identifier corresponding to a service network, a service institution identifier corresponding to a second service institution that issued the 2D code, and a payload including a service object identifier corresponding to a service object of the service network. The one or more data elements is sent to the second service institution based on the service institution identifier. The service information associated with the service object is received from the second service institution based on the service object identifier, and the service information is sent to the first service institution for presenting on the mobile device.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, by issuing a temporary trusted login token, a first server can use a service authorization to provide limited access from an originating application to a service page of a target application without performing additional login steps. Second, the limited access allowed by the service authorization can protect unauthorized service pages from being accessed using trusted login, which improves data security. Third, by returning service pages to the originating application after a trusted login, a trusted user does not need to be redirected to the target application to perform the service, improving the user's experience.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

BRIEF DESCRIPTION OF THE DRAWINGS

Like reference numbers and designations in the various drawings indicate like elements.

DETAILED DESCRIPTION OF THE EMBODIMENTS

Figure 1:
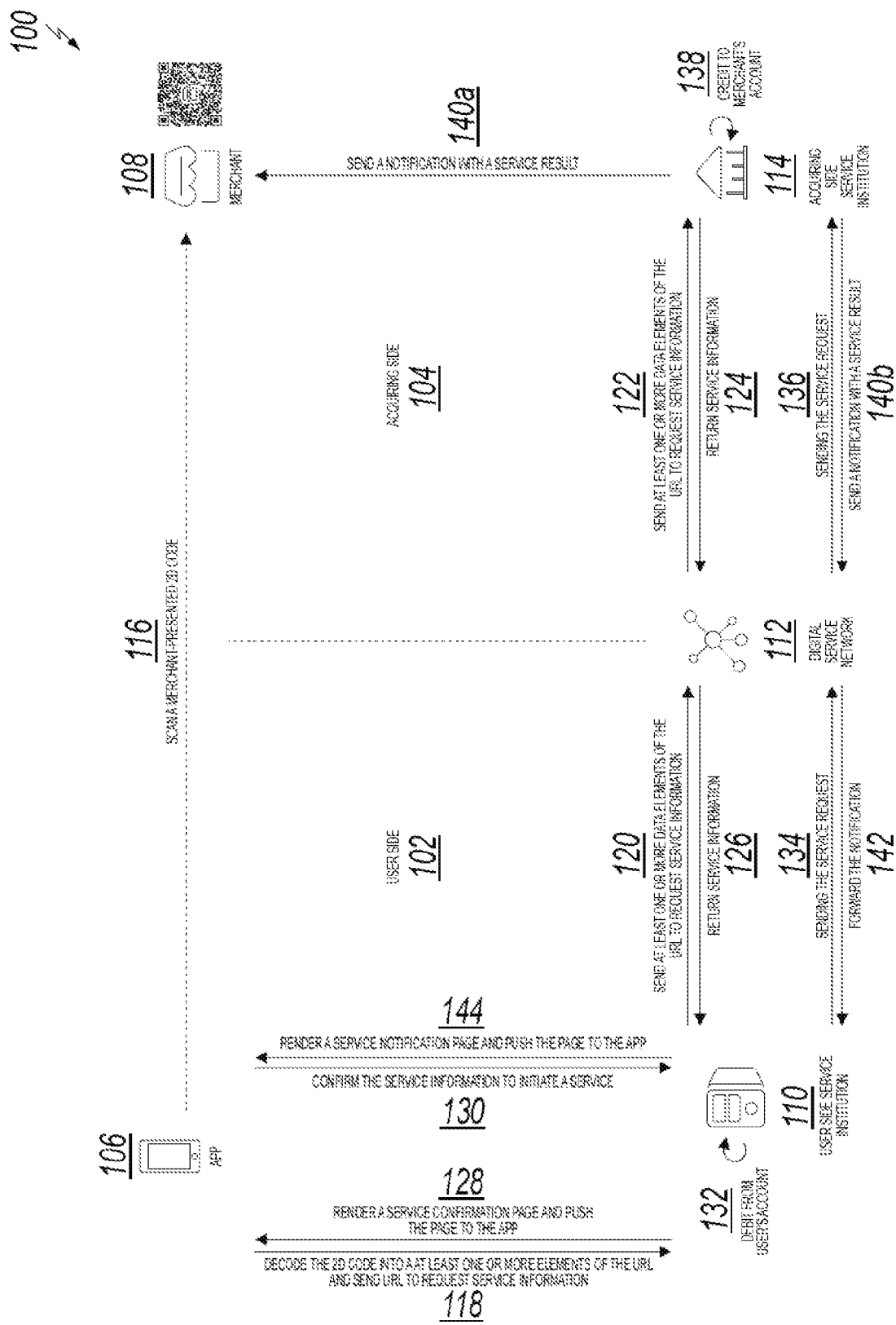
FIG. 1 is a schematic diagram illustrating an example of a service processing workflow of a digital service system, according to an implementation of the present disclosure.

With the development of mobile Internet, 2D codes are becoming more widely used in various service scenarios due to the fast and accurate scanning and decoding capabilities of smartphones. As more and more online to offline (O2O) platforms emerge, users are able scan 2D codes to access various services such as online ordering, payment, and product tracking. The wide use of 2D codes has in turn greatly facilitated the O2O integration process. In many cases, 2D codes deployed by service providers are not merely information bearers, but interaction medium for service initiation, processing and information exchange.

Merchant-presented 2D codes are often used in mobile payment. Commonly used merchant-presented 2D codes can include merchant codes, order codes, interoperability codes, or aggregation codes. To unify users' mobile payment experience, reduce 2D code deployment cost, and standardize the mobile payment market, regulatory authorities in some countries (or regions) have established their own regional unified 2D code standards governing the format of these 2D codes. However, different merchants may use different payment institutions or service platforms to collect payment or provide backend services. Correspondingly, merchant-presented 2D codes may be associated with or issued by different service institutions. As a result, management of the 2D code service processing can be complicated and can lack uniformity.

The present disclosure describes a method for managing services associated with uniform resource locator (URL)-based 2D codes, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

A user can use a mobile device to scan a 2D code to obtain corresponding service information for initiating a service. Instead of embedding the service information in the 2D code, a 2D code can be generated based on a slim terminal model (STM) that carries a URL. The URL can be used to identify a data interface associated with the service information. By scanning the 2D code, a mobile device can obtain the embedded URL and forward it to a backend service system. A digital service network in the backend service system can perform the role of a central hub for managing and facilitate services across different service institutions or platforms. The digital service network can identify the service institution that manages or maintains the service information based on data elements included in the URL. The backend service system can then retrieve the service information and return it to the mobile device for initiating the service. Because the 2D code does not carry service information, it can be scanned and parsed more quickly. When service information needs an update, the update can be performed by the service institution at the backend instead of updating the frontend 2D code itself. Service processing can be efficiently coordinated by the digital service network regardless of how many service institutions are involve. As such, 2D code-based service processing can be more efficiently and securely performed. Various implementations and technical effects according to the present disclosure are discussed in the description below.

FIG. 1 is a schematic diagram illustrating an example of a service processing workflow of a digital service system 100, according to an implementation of the present disclosure. At a high-level, the digital service system 100 can include a user side 102 and an acquiring side 104. The user side 102 can include a frontend application (APP) 106 installed on a mobile device and a backend user side service institution 110. The acquiring side 104 can include a service provider, such as a merchant 108 and an acquiring side service institution 114. In some implementations, the service institutions of the user side 102 and the acquiring side 104 can be interconnected by a digital service network 112 or a central transfer platform (CTP). It is to be understood that the digital service network 112 can serve a plurality of service institutions on the user side and a plurality of service institutions on the merchant side. The services facilitated by the service institutions 110, 114 and the digital service network 112 can be any suitable services such as payment services, Internet-of-things (IOT) information, location-based services (LBS), content services, or APP installation services. For example, if the service is a payment service, the APP 106 can be a digital payment APP, the user side service institution 110 and the acquiring side service institution 114 can be user side payment institution and service side institution, and the digital payment network 112 can be a digital payment network. The service processing workflow of the digital service system 100 can be described through the illustration of the following example.

At 116, a merchant-presented URL-based 2D code is scanned by using a mobile APP 106 installed on a mobile device. The URL-based 2D code can be in the form of any two-dimensional code such as a QR code. Depending on specific application scenarios, the URL-based 2D code can be deployed as a merchant code, an order code, an interoperability code, a regionally unified code, or other type of code. These codes are explained in greater detail below.

The URL-based 2D code can be generated based on an STM. The STM refers to a user-merchant interaction scenario in which a small amount of information is exchanged during the interaction. When using an STM, the service information collection is not limited to the data interaction period from scanning the merchant-presented 2D code, since a relatively small amount of information is encoded to the 2D code. This is in contrast to a rich terminal model (RTM) where most service information for processing a service is encoded to the 2D code. Because a small portion of service information is obtained by scanning the STM 2D code, majority of service information acquisition can be performed by a backend server. As such, the main party involved in performing the service is the user associated with the service APP 106 that scans the 2D code, regardless of how may service platforms or institutions the account is associated with. Because a relatively small amount of information is encoded in the 2D code, the majority of service information collection can be delegated to the backend server, leading to faster data interaction between the APP 106 and the 2D code, and more robust data security due to less information exposure at the frontend. Moreover, since the majority of the service information can be managed and maintained at the backend, when service information needs to be updated, the merchant 108 may not need to request and re-deploy a new 2D code as under the STM scenario. In some cases, such an update can be made at the backend to reduce the deployment and material cost of re-deploying new 2D codes.

In some implementations, the 2D code generated based on the STM can have an information format of a URL. Table 1 illustrates example data elements of a URL encoded in the 2D code. It is to be understood that a URL according to the present disclosure can include only a portion of the data elements listed below or additional data elements.

TABLE 1

<Protocol Header>://<Domain Name>/<Network ID>/<Version ID>/<Service Type ID>/<Service Institution ID>/<Payload>[?Parameter1=Value1&Parameter 2=Value2&. . .]

As shown in Table 1, the data elements of a URL include "protocol header", "domain name," "network ID," "version ID," "service type ID," "service institution ID," "payload," and one or more parameters. These data elements can be either expressed in a text-form or a digital form. The "protocol header" can indicate the protocol used for data communication. For example, the "protocol header" can be "https" if Hypertext Transfer Protocol Secure (HTTPS) is the data communications protocol associated with the URL. In some implementations, the domain name can be applied for and managed by operators of the digital service network 112. For example, a domain name can be expressed in a text form as "qr.demodigitalnetwork.com." The network ID can identify the digital service network used to manage or facilitate the service. The network ID can have different lengths. For examples, a network ID in a text form can be expressed as "demodigitalnetwork," a network ID expressed in a digital form can take an integer value between 25 and 30. The version ID can have different lengths. It can be defined by the digital service network 112 to identify the version number of the digital service network 112. For example, a version ID can be expressed in a text form as "v2" to identify the digital service network 112 used in the second version.

The service type ID can identify applicable services associated with the URL-based 2D code. Table 2 illustrates example services and their corresponding URL expressions in text and digital forms.

TABLE 2

| Text Form | Digital Form | Description | Service |
|---|---|---|---|
| fund_transfer | 01 | Transfer | Account Transfer by Scanning 2D Code |
| order_qr_payment | 04 | Order Code | Make Payment by Scanning Order Code |
| merchant_qr_payment | 05 | Merchant Code | Collect Payment by Scanning Merchant Code |
| group_qr | 06 | Group Code | Scan 2D Code to Join Social Media Group |

Service institution ID can identify an acquiring side 104 service institution 114 that acquires service for the merchant 108. For example, if the service is a payment service, the service institution ID can identify the payment institution 114 that collects payment for the merchant 108. In some implementations, the URL-based 2D code can be issued by the service institution 114 identified by the service institution ID. For examples, a service institution ID in a text form can be expressed as "demopaymentinstitution," a network ID expressed in a digital form can take an integer value between 001 and 999. In some implementations, the service institution ID can be set as "default" or a null value (for example, "000") to indicate that a default service institution or no service institution is designated.

The payload can include an identifier that identifies a service object of the digital service network 112. The service object can be an interface used to link service information managed and maintained by the acquiring side service institution 114. In some implementations, service information can include merchant information such as a merchant name, a merchant type, a country code or a zip code of the merchant, a merchant address, one or more supported languages, and one or more supported currencies. In some implementations, service information can also include order information or transaction information such as an order amount, supported currency, order ID, order or transaction descriptions. It can be understood that service information can include other information related to performing the service.

Parameters can identify one or more add-on services provided by the backend server of the acquiring side service institution 114. The parameters can be in the format of key-value pairs. The add-on service can include, but not limited to, additional order information, sales information, or other information such as one or more loyalty numbers, digital voucher information, coupon information, lucky drawing information, global positioning system (GPS) location, table number, a seat number, etc.

As such, an example URL in a text format encoded in a 2D code according to the present disclosure can be expressed as:
https://qr.demodigitalnetwork.com/demodigitalnetwork/v2/merchant_qr_payment/demopaymentinstitution/012345678901234

An example URL in a digital format encoded in a 2D code according to the present disclosure can be expressed as:
https://qr.demodigitalnetwork.com/28/2/05/001/012345678901234

Figure 2:
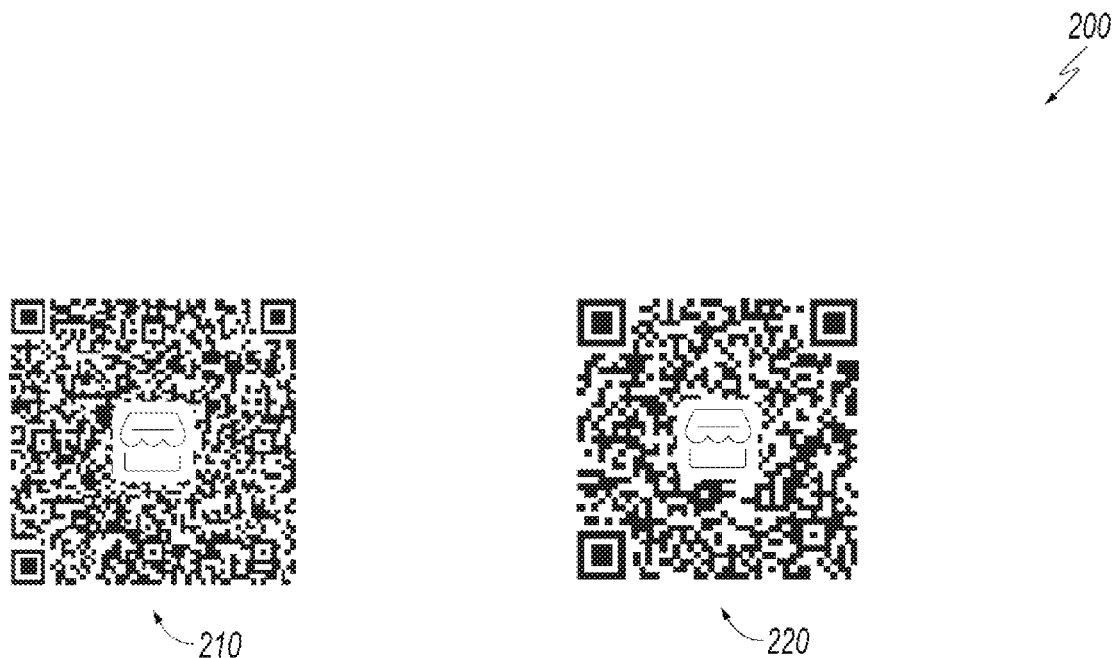
FIG. 2 is a diagram illustrating examples of URL-based 2D codes generated based on a slim terminal model, according to an implementation of the present disclosure.

Corresponding visual depictions of example URL based 2D codes are shown in FIG. 2. FIG. 2 is a diagram illustrating examples of URL-based 2D codes 200 generated based on an STM, according to an implementation of the present disclosure. A visual depiction of a text URL-based 2D code 210 is shown on the left of FIG. 2. A visual depiction of a digital URL-based 2D code 220 is shown on the right of FIG. 2.

At 118, service information is requested by sending a URL decoded from scanning a URL-based 2D code. Using payment service as an example, a user can make a mobile payment to a merchant by scanning a merchant-presented URL-based 2D code. The user can open a digital payment APP 106, such as ALIPAY, installed on a mobile device, log in to a service or payment account associated with the APP 106, and use the scanning function of the APP to scan the code through a camera of the mobile device. In some implementations, the mobile device can decode the 2D code to a character string in a URL format, which includes one or more of the data elements as discussed in the description of 116. The mobile device can then send the decoded URL as a character string to the user side service institution 110. In some implementations, the user side service institution can be a payment institution that provides service or payment account to APP 106 users.

At 120, the URL is parsed by the user side service institution 110 and at least a portion of the URL is sent to the digital service network 112. The URL may include data elements such as a service network ID, a service institution ID, a version ID, a payload, and a service type ID. The purpose of parsing the URL includes determining whether the URL-based code is issued by the user side service institution 100. For example, this can be done by parsing the URL to identify the service institution ID data element. If the service institution ID matches the ID of the user side service institution 110, the user side service institution 100 can determine that it maintains the corresponding service information and returns the service information to the mobile device. Otherwise, the user side service institution 100 can send at least a portion of the URL as a data string to the digital service network 112 based on the service network ID parsed from the URL, to identify the service institution associated with the service institution ID included in the URL. In some cases, this portion of the URL includes at least a service institution ID, and a service type ID. In some implementations, the user side service institution 100 can identify the service institution associated with the service institution ID. In such cases, the user side service institution can directly request the service information from the corresponding service institution by sending at least the service type ID and payload to the service institution.

At 122, the portion of URL is parsed by the digital service network 112 and a service type ID and a payload included in the portion of URL is sent to an acquiring side service institution 114. The digital service network 112 parses the received of the URL to determine the service institution ID, the service type ID, and the payload. The digital service network 112 can maintain a list of service institution IDs that correspond to one or more service institutions. The digital service network 112 can send the service type ID and the payload of the received URL to the acquiring side service institution 114 that matches the service institution ID.

At 124, the requested service information is returned by the acquiring side service institution 114 to the digital service network 112 based on the service type ID and the payload. The acquiring side service institution 114 can determine the code type of the URL-based 2D code based on the service type ID. The code type can determine the service information to be returned to the mobile device based on the service type ID. For example, if the code type is a fund transfer, the service information to be returned can be order information that includes party name that the fund will be transferred to, transaction ID, supported currency, etc. If the code type is an order code, the service information to be returned to the mobile device can include a merchant name the payment will be made to and a payment amount so the user can confirm the order using the mobile device. If the code type is a merchant code, the service information to be returned to the mobile device can include a merchant name so the user can verify and enter a payment amount if the merchant name is correct.

The payload can include an identifier of a service object of the digital service network 112. The service object can be an interface that links to different service information managed and maintained by the acquiring side service institution 114. If the URL data elements sent to the acquiring side service institution 114 further include one or more parameters, information of one or more add-on services provided by the backend server of the acquiring side service institution 114 can be returned. The add-on service can include additional order information, merchant information, sales information, or other information such as one or more loyalty numbers, digital voucher information, coupon information, lucky drawing information, GPS location, table number, a seat number, or other information.

As can be seen from the above description, the URL decoded from the 2D code generated under an STM provides identifiers to locate and return service information. The 2D code itself does not carry service information. Therefore, as compared to RTM 2D code which carries service information, the STM 2D code is decoupled with service information. The advantages of decoupling 2D code from service information can be illustrated in the description of FIG. 3.

Figure 3:
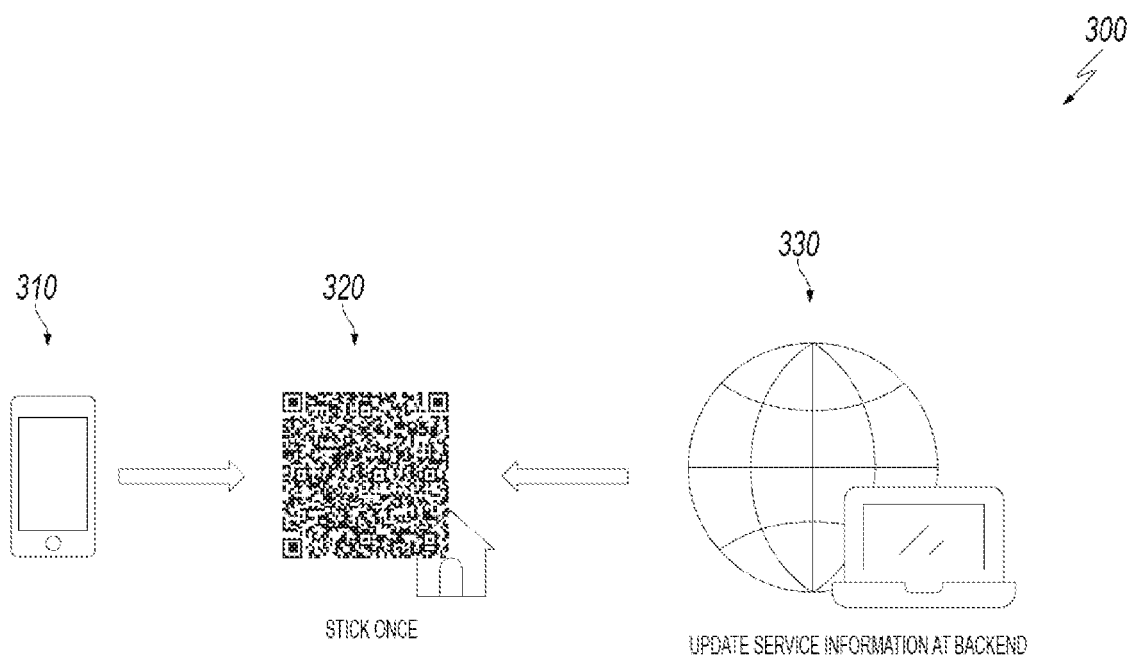
FIG. 3 is a schematic diagram illustrating an example of the "stick once" concept based on a slim terminal model, according to an implementation of the present disclosure.

FIG. 3 is a schematic diagram illustrating an example 300 of the "stick once" concept based on an STM, according to an implementation of the present disclosure. After a 2D code is issued to a service provider such as a merchant, the service provider only need to stick the 2D code once 320. In case service information associated with the 2D code changes, the 2D code does not need to be replaced. The changes to the service information can be made by the back office or backend 330, such as the acquiring side service institution 114 or the digital service network 112 and link to the service object identified by the identifiers included in the payload, as discussed in the description of FIG. 1. After a mobile device 310 scans the 2D code, a URL decoded from the 2D code can be used to retrieve the updated service information. In this example 300, the 2D code is a merchant code for collecting payment, and the merchant has changed its merchant information such as the merchant name and supported payment currency, the corresponding merchant information can be updated by a payment institution used by the merchant. A mobile device 310 can obtain the updated merchant name and supported payment currency by scanning the same 2D code. As compared to the RTM 2D code, because service information is embedded, the RTM 2D code needs to be replaced when the service information is updated. Moreover, since the RTM 2D code carries service information, scanning the RTM 2D code can be slower as compared to scanning an STM 2D code, which does not carry service information.

Figure 4:
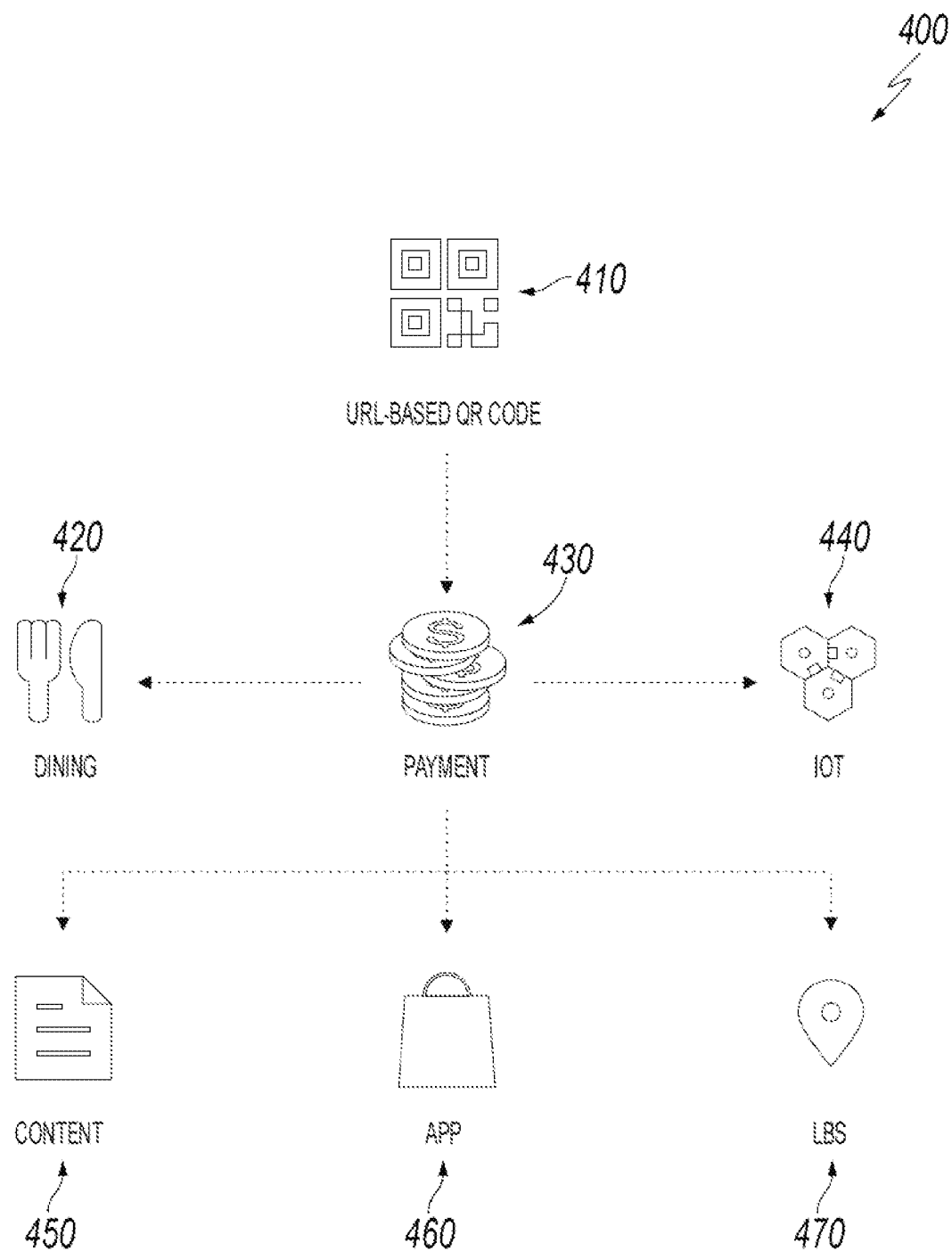
FIG. 4 is a schematic diagram illustrating an example of interoperability of services with URL-based 2D code, according to an implementation of the present disclosure.

Various types of service information can be updated by using the URL-based 2D code. FIG. 4 is a schematic diagram illustrating an example 400 of interoperability of services with URL-based 2D code, according to an implementation of the present disclosure. In this example 400, URL decoded from scanning a 2D code 410 can be used to initiate services such as dining services 420, payment services 430, IOT information 440, web content 450, APP download 460, or LBS 470. By associating different services to the service type ID and service objects identified in the URL, different types of services or service information can be obtained by the mobile device from scanning the 2D code 410.

Referring again to FIG. 1, at 126, the service information is returned by the digital service network 112 to the service account provider. At 128, a service confirmation page that includes the returned service information is rendered by the user side service institution 110 and pushed to the APP 106 on the mobile device. In some implementations, the user side service institution 110 returns the service information forwarded by the digital service network 112 to the mobile device. The APP 106 installed on the mobile device can render the service information on a service confirmation page.

Using mobile payment as an example, if the service information (for example, a merchant name) is correct, the user can confirm the service information or provide input if needed (for example, enter a payment amount) to initiate a payment request at 130. At 132, the user side service institution 110 receives the payment request and debit the corresponding payment amount from the user's account. At 134, user side service institution 110 sends a payment to the digital service network 112. At 136, the digital service network 112 forwards the payment to the acquiring side service institution 114. The acquiring side service institution 114 processes the payment and credits the merchant 108 at 138, sends a payment confirmation to the merchant 108 at 140a and to the digital service network 112 at 140b. The digital service network forwards the payment confirmation to the user side service institution 110 at 142 and the user side service institution 110 forwards the payment confirmation to the APP 106 or renders a payment confirmation page and pushes to the APP 106.

During the service processing workflow, direct information exchange between the APP 106 and the acquiring side 104 is relatively limited. A majority of the information is exchanged at the backend between the user side service institution 110, digital service network 112 and acquiring side service institution 114. The information exchange environment has high credibility, and data security between the parties can be better protected.

Figure 5:
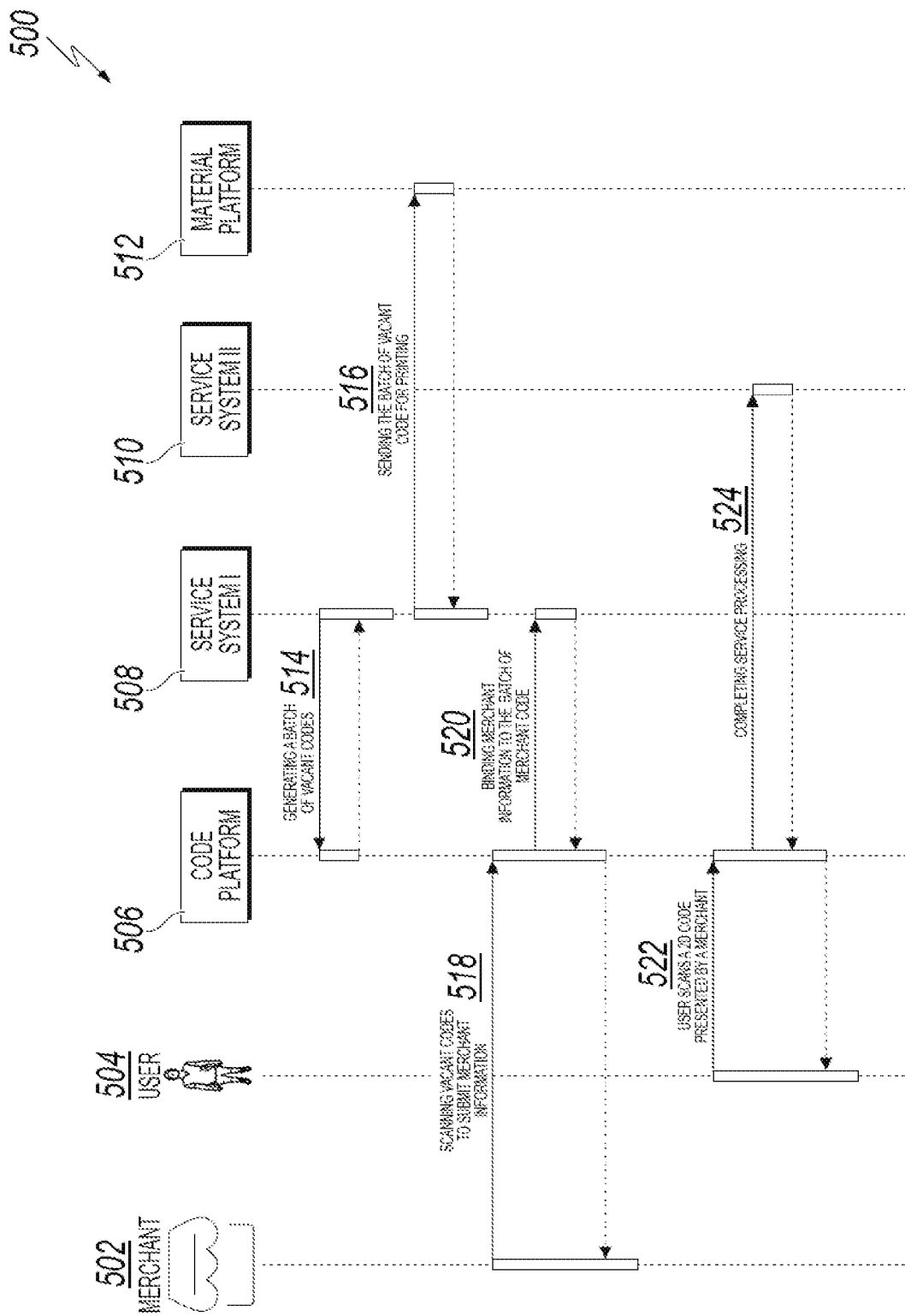
FIG. 5 is a swim-lane diagram illustrating an example of a 2D code binding procedure, according to an implementation of the present disclosure.

FIG. 5 is a swim-lane diagram illustrating an example of a 2D code binding procedure 500, according to an implementation of the present disclosure. The code binding process can be used to quickly generate a batch of regional unified 2D codes.

At 514, a service system I 508 generates a batch of vacant codes and send to a code platform 506. The vacant codes can be URL-based STM 2D codes as discussed in the description of FIG. 1. The 2D codes are vacant because the embedded URLs are not associated with any service information. In some implementations, the service system I 508 can be an acquiring side service institution 114 as discussed in the description of FIG. 1. In some implementations, the service system I 508 may collect merchant information such as the number of merchants to be served to determine the number of vacant codes to be generated. The code platform 506 can be part of the service system I 508 or independent from the service system I 508.

At 516, the service system I 508 sends the batch of vacant codes to a material platform 512 for printing and sending back to the service system I 508. The material platform 512 can be part of the service institution or independent from the service system I 508.

At 518, merchants 502 served by the service system I 508 scan the batch of vacant codes to submit merchant information to be bound to the vacant codes. Merchant information can include service information as discussed in the description of FIG. 1. By sending merchant information to the code platform, the code platform can bind corresponding service type and service object identified in the URL of the vacant code to the merchant information.

At 520, code platform 506 binds the merchant information to the batch of vacant codes. After binding, the URL-based 2D code is no longer vacant, but associated with corresponding merchant information. The service system I 508 can then distribute the printed codes to the corresponding merchants 502 it serves.

At 522, a user scans a URL-based 2D code presented by a merchant 502 to initiate corresponding service processing. At 524, the service processing can be proceeded to a service institution II 510 such as the user side service institution 110 discussed in the description of FIG. 1. The remaining service processing can be performed based on the example workflow 100 as discussed in the description of FIG. 1.

Figure 6:
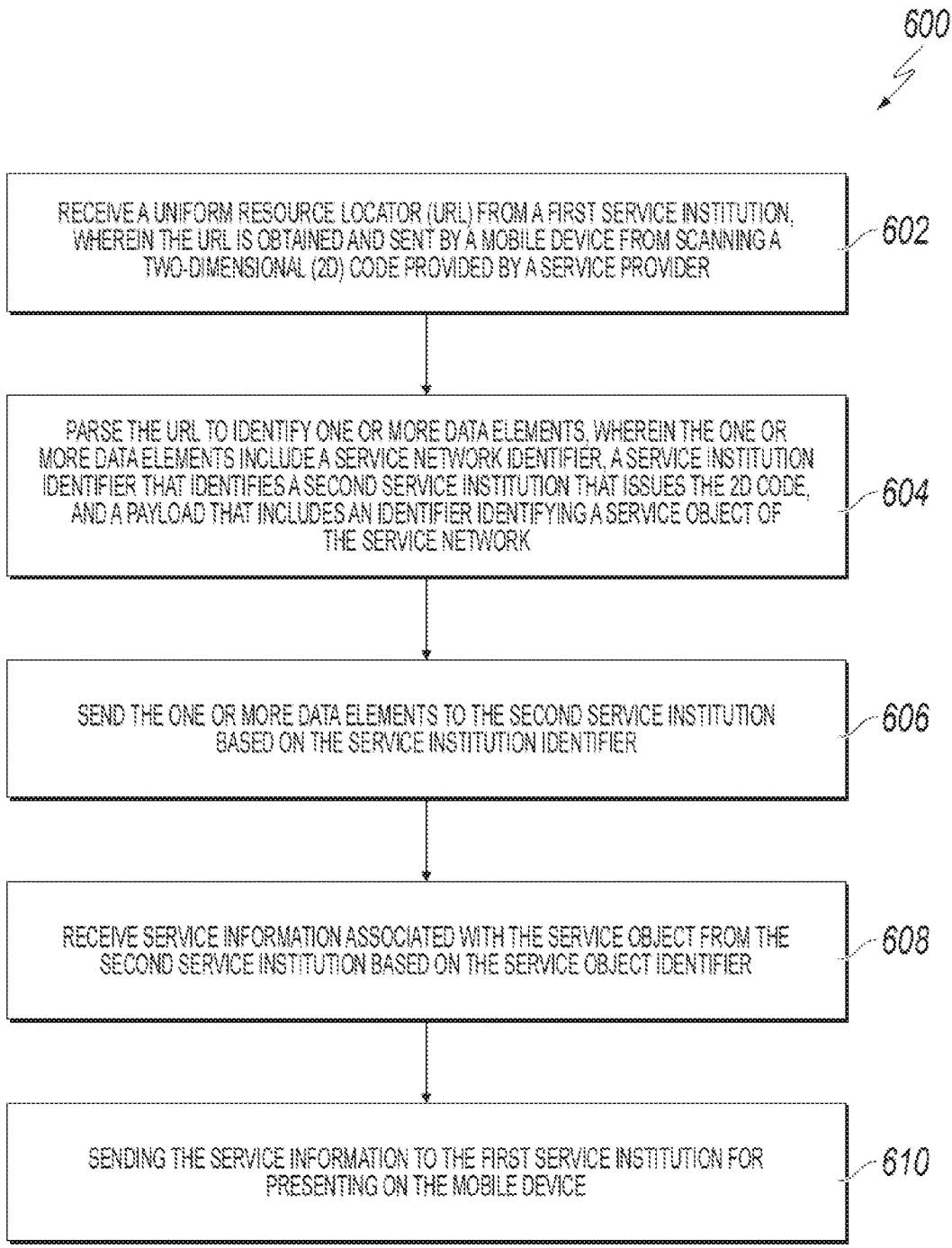
FIG. 6 is a flow illustrating an example of a method of processing services based on URL-based 2D code, according to an implementation of the present disclosure.

FIG. 6 is a flow illustrating an example of a method 600 of processing services based on URL-based 2D code, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a URL from a first service institution is received, wherein the URL is obtained and sent by a mobile device from scanning a 2D code provided by a service provider. The method 600 can be performed by a digital service network 112 that connects and serves one or more service institutions as discussed in the description of FIG. 1. The first service institution can be a user side service institution 110. The 2D code can be a URL-based 2D code such as a regional unified merchant-presented QR code generated based on STM. The 2D code can be presented by a service provider (for example, a merchant) to initiate a service (for example, payment service). A user can open an APP associated with a user account to scan the 2D code. A URL can be obtained from scanning the 2D code and sent to the service institution that provides the user account. The service institution can parse the URL to identify a network ID and send at least a portion of the URL to the digital service network corresponding to the network ID. From 602, method 600 proceeds to 604.

At 604, the URL is parsed to identify one or more data elements, wherein the one or more data elements include a service network ID, a service institution ID that identifies a second service institution that issues the 2D code, and a payload that includes an identifier identifying a service object of the service network. In some implementations, the one or more data elements further include at least one of a domain name, a version number of the service network, a service type ID that identifies a service type, or one or more key-value pairs that identify one or more add-ons to a service to be processed. The one or more data elements included in the URL can be either in a digital format or a text format. The one or more add-ons to the service to be processed includes at least one of a loyalty number, voucher information, coupon information, lucky drawing information, a global positioning system (GPS) location, a table number, or a seat number. From 604, method 600 proceeds to 606.

At 606, the one or more data elements are sent to the second service institution based on the service institution ID. The second service institution can be the acquiring side service institution 114 that issues the URL-based 2D code as discussed in the description of FIG. 1. From 606, method 600 proceeds to 608.

At 608, service information associated with the service object from the second service institution is received. In some implementations, the service information includes at least one of service provider information or order information. Example service provider information includes a service provider name, a service provider type, a country code, a zip code, a service provider address, order information, one or more supported languages, or one or more supported currencies. Example order information includes a transaction amount, a transaction currency, an order identifier, or an order description. From 608, method 600 proceeds to 610.

At 610, the service information is sent to the first service institution to be presented on the mobile device. In some implementations, after the user of the mobile device verifies the service information, it can send a service request to initiate a service. In such cases, a service request can be received by the digital service network from the first service institution. The digital service network can then send the service request to the second service institution for processing the service. After processing, a service processing result is received from the second service institution. The digital service network can then send the service processing result to the first service institution to be presented on the mobile device. After 620, method 600 stops.

Implementations of the subject matter described in this specification can be implemented so as to realize particular advantages or technical effects. For example, since majority of service information can be managed and maintained at the backend, when service information needs to be updated, the service provider may not need to request and re-deploy a new 2D code as under the RTM scenario. The update can sometimes be made at the backend to reduce deployment and material cost. The URL decoded from the 2D code generated under an STM provides identifiers to locate and return service information. The 2D code itself does not carry service information. Therefore, the STM 2D code is decoupled from its underlying services. The STM can also allow a batch of URL-based 2D codes to be quickly generated.

The described methodology permits enhancement of various mobile computing device processing efficiency and data security. Because a relatively small amount of information is encoded in the 2D code based on STM, majority of service information collection can be delegated to the backend server, the data interaction between a mobile device and the 2D code is faster and the data security is higher due to less information exposure at the frontend. As such, the information exchange environment has high credibility, and data security between the parties can be better protected.

The described methodology can ensure the efficient usage of computer resources (for example, processing cycles, network bandwidth, and memory usage), through the efficient scanning, generation of 2D codes, and reducing the amount of 2D codes regeneration. At least these actions can minimize or prevent waste of available computer resources in a mobile Internet service environment. Instead of replacing existing 2D codes when service information is updated, the 2D codes can be kept the same by associating them with updated service information.

Implementations and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method for coordinating service processing using multiple service institutions, the method comprising:

receiving, by a code platform that is associated with a first service institution and from a mobile device, a uniform resource locator (URL) that was encoded in a two-dimensional (2D) code that (i) was generated, and provided to a service provider, by a second service institution based upon a slim terminal model (STM), and (ii) was scanned by the mobile device when presented by the service provider for use by the mobile device in obtaining service information for initiating a service of the service provider;

selecting, by the code platform that is associated with the first service institution and based on parsing the URL, one or more data elements that are encoded in the URL;

transmitting, by the code platform that is associated with the first service institution, the selected one or more data elements to the second service institution that provided the 2D code to the service provider;

in response to transmitting the selected one or more data elements to the second service institution that provided the 2D code to the service provider, receiving, by the first service institution and from the second service institution, the service information; and providing, by the first service institution, the service information that was received from the second service institution to the mobile device in response to receiving the URL.

2. The method of claim 1, wherein the selected one or more data elements include a service type that is associated with the service provider, an identifier of the second service institution, or a service network.

3. The method of claim 1, wherein the selected one or more data elements are transmitted to the second service institution using a service network that is identified in the one or more data elements.

4. The method of claim 1, wherein the service information comprises a name of the service provider, an address of the service provider, one or more supported languages, one or more supported currencies, an order identifier, an order amount, or an order description.

5. The method of claim 1, wherein the 2D code encodes identifiers for each of a service network, and the second service institution.

6. The method of claim 1, wherein the 2D code does not encode the service information that is received by the first service institution from the second service institution.

7. A non-transitory, computer-readable medium storing one or more instructions executable by a computer system to perform operations for coordinating service processing using multiple service institutions, the operations comprising:

receiving, by a code platform that is associated with a first service institution and from a mobile device, a uniform resource locator (URL) that was encoded in a two-dimensional (2D) code that (i) was generated, and provided to a service provider, by a second service institution based upon a slim terminal model (STM), and (ii) was scanned by the mobile device when presented by the service provider for use by the mobile device in obtaining service information for initiating a service of the service provider;

selecting, by the code platform that is associated with the first service institution and based on parsing the URL, one or more data elements that are encoded in the URL;

transmitting, by the code platform that is associated with the first service institution, the selected one or more data elements to the second service institution that provided the 2D code to the service provider;

in response to transmitting the selected one or more data elements to the second service institution that provided the 2D code to the service provider, receiving, by the first service institution and from the second service institution, the service information; and providing, by the first service institution, the service information that was received from the second service institution to the mobile device in response to receiving the URL.

8. The medium of claim 7, wherein the selected one or more data elements include a service type that is associated with the service provider, an identifier of the second service institution, or a service network.

9. The medium of claim 7, wherein the selected one or more data elements are transmitted to the second service institution using a service network that is identified in the one or more data elements.

10. The medium of claim 7, wherein the service information comprises a name of the service provider, an address of the service provider, one or more supported languages, one or more supported currencies, an order identifier, an order amount, or an order description.

11. The medium of claim 7, wherein the 2D code encodes identifiers for each of a service network, and the second service institution.

12. The medium of claim 7, wherein the 2D code does not encode the service information that is received by the first service institution from the second service institution.

13. A system comprising:
one or more computers; and
one or more computer memory devices interoperably coupled with the one or more computers and having tangible, non-transitory, machine-readable media storing one or more instructions that, when executed by the one or more computers, perform one or more operations for coordinating service processing using multiple service institutions, the operations comprising:

receiving, by a code platform that is associated with a first service institution and from a mobile device, a uniform resource locator (URL) that was encoded in a two-dimensional (2D) code that (i) was generated, and provided to a service provider, by a second service institution based upon a slim terminal model (STM), and (ii) was scanned by the mobile device when presented by the service provider for use by the mobile device in obtaining service information for initiating a service of the service provider;

selecting, by the code platform that is associated with the first service institution and based on parsing the URL, one or more data elements that are encoded in the URL;

transmitting, by the code platform that is associated with the first service institution, the selected one or more data elements to the second service institution that provided the 2D code to the service provider;

in response to transmitting the selected one or more data elements to the second service institution that provided the 2D code to the service provider, receiving, by the first service institution and from the second service institution, the service information; and providing, by the first service institution, the service information that was received from the second service institution to the mobile device in response to receiving the URL.

14. The system of claim 13, wherein the selected one or more data elements include a service type that is associated with the service provider, an identifier of the second service institution, or a service network.

15. The system of claim 13, wherein the selected one or more data elements are transmitted to the second service institution using a service network that is identified in the one or more data elements.

16. The system of claim 13, wherein the service information comprises a name of the service provider, an address of the service provider, one or more supported languages, one or more supported currencies, an order identifier, an order amount, or an order description.

17. The system of claim 13, wherein the 2D code encodes identifiers for each of a service network, and the second service institution.

18. The system of claim 13, wherein the 2D code does not encode the service information that is received by the first service institution from the second service institution.

* * * * *